Aug. 3, 1965 C. G. STEWART 3,198,719
GARDENING TOOL
Filed Dec. 31, 1962 3 Sheets-Sheet 1
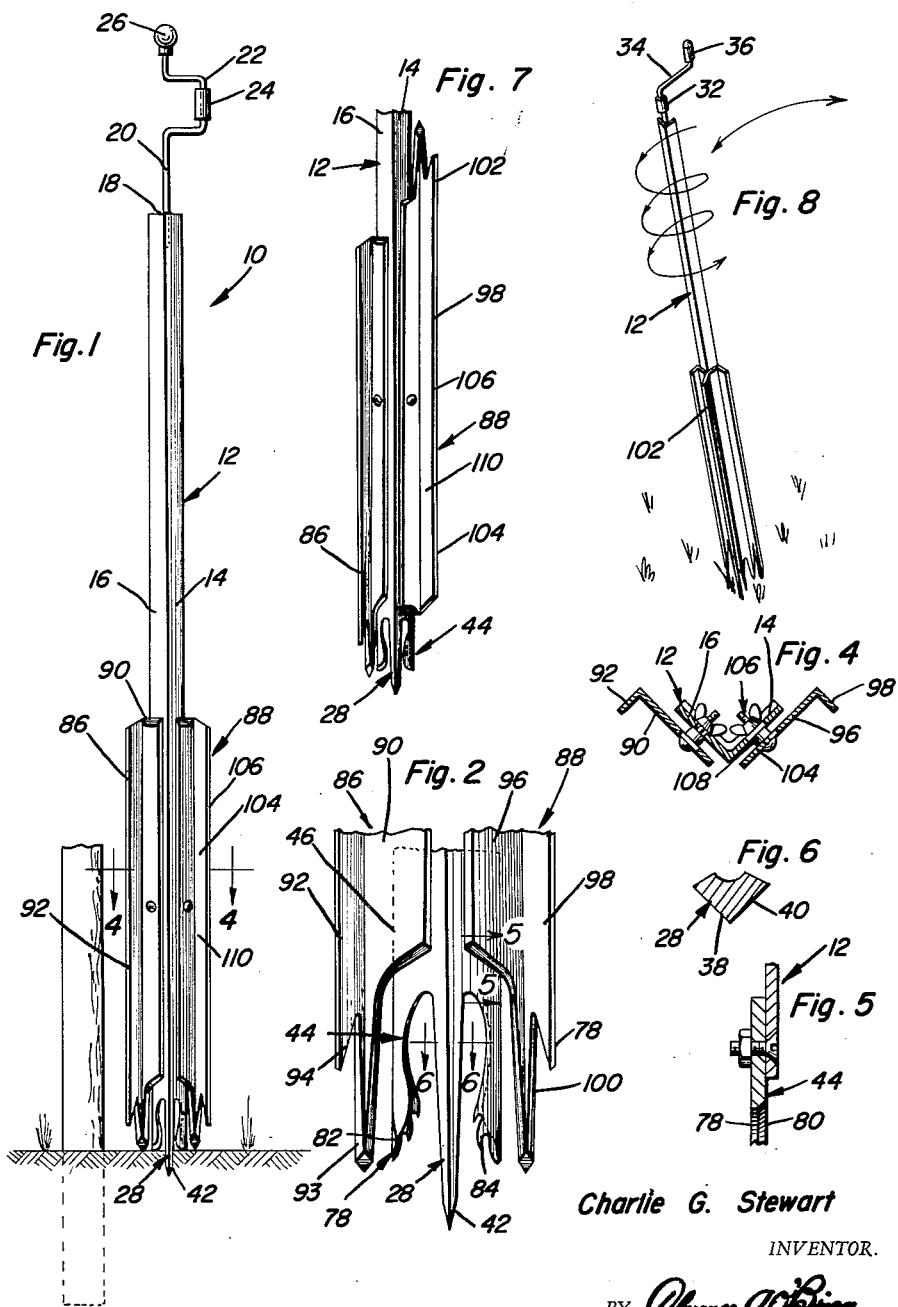
Charlie G. Stewart
INVENTOR.

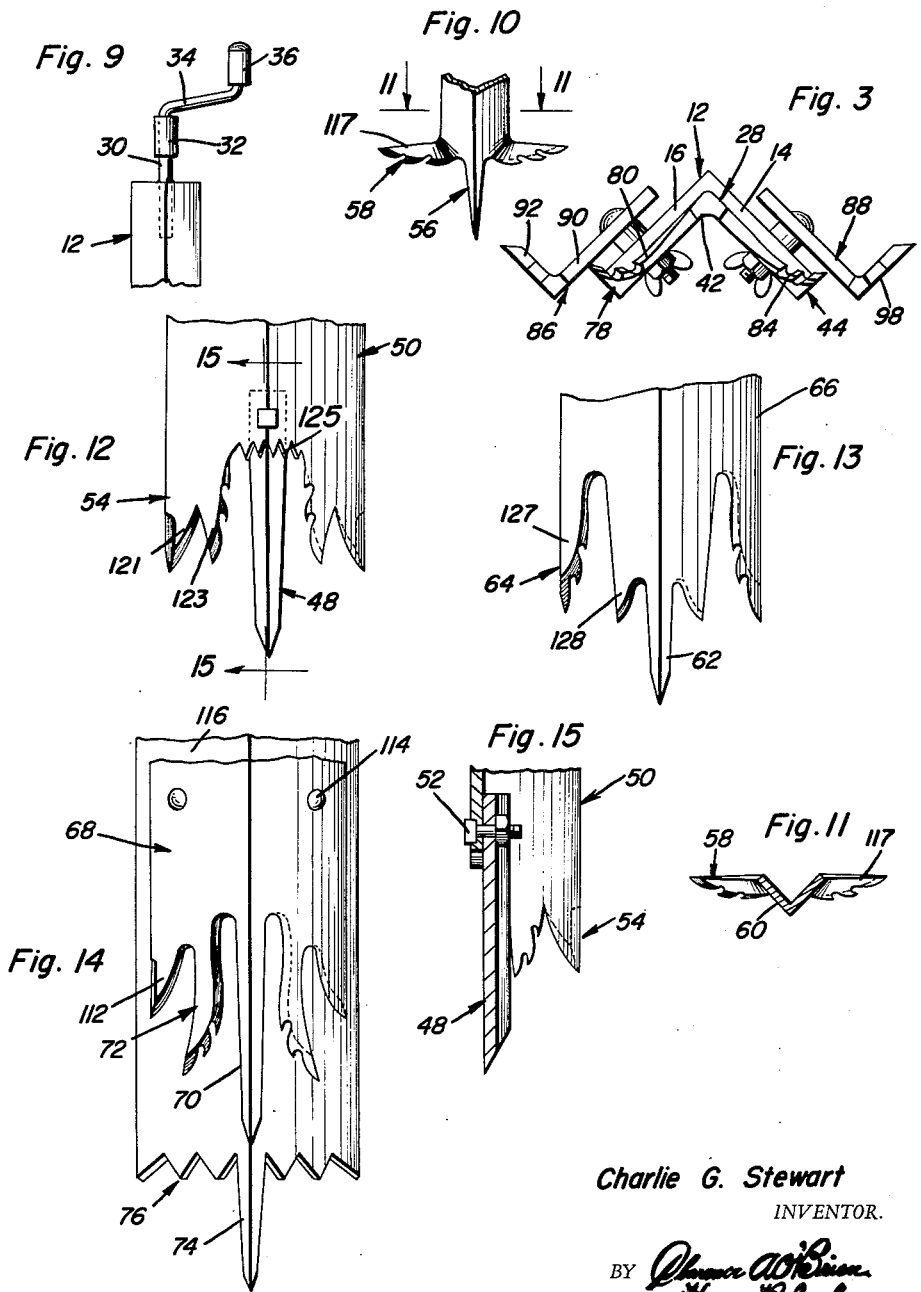

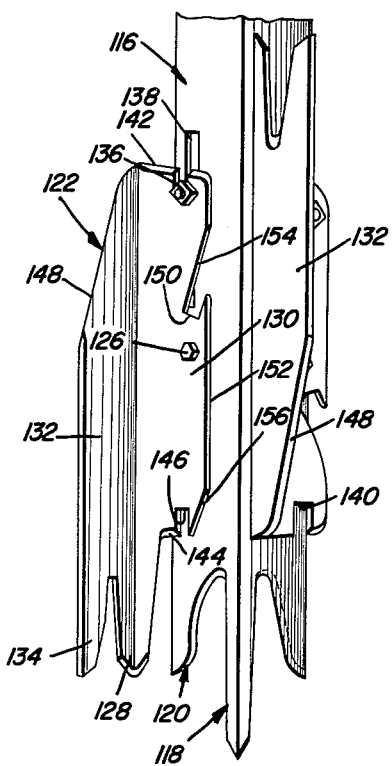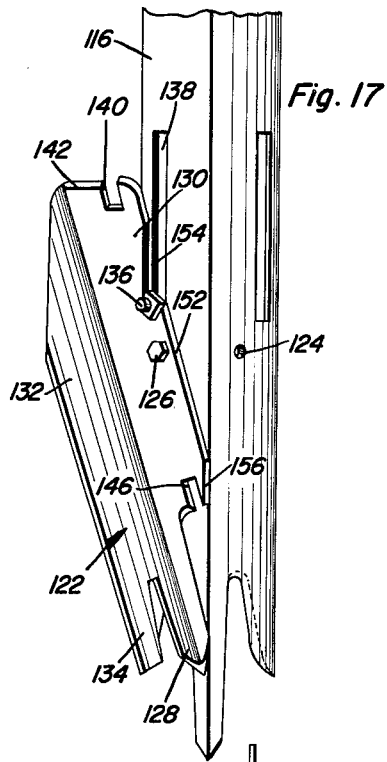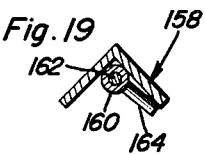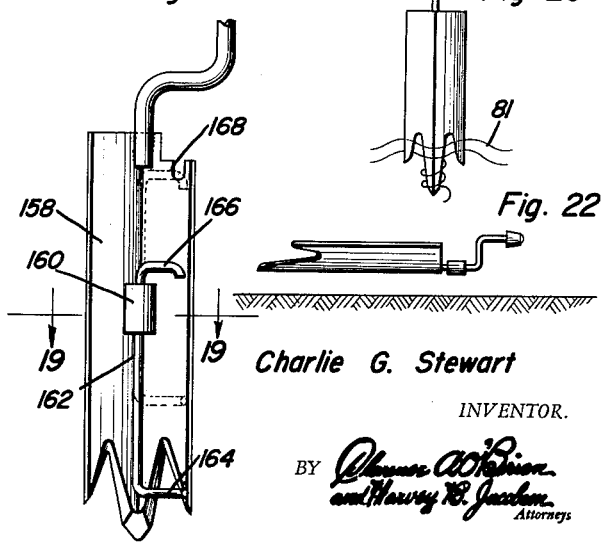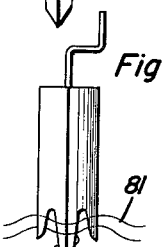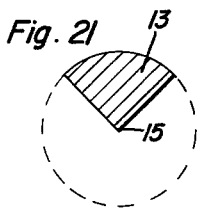
Charlie G. Stewart
INVENTOR.

United States Patent Office 3,198,719
Patented Aug. 3, 1965

3,198,719
GARDENING TOOL
Charlie G. Stewart, P.O. Box 327, Fairfield, Ala.
Filed Dec. 31, 1962, Ser. No. 248,441
10 Claims. (Cl. 294—50.5)

This invention relates to a gardening tool which is useful in connection with various garden and lawn cultivating operations such as the formation of irrigation holes for plants and trees, digging of holes for bulbs, removal of undesired vegetation, etc.

It is therefore a primary object of the present invention to provide a hand-operated gardening tool particularly useful in connection with the working of the soil and removal of weeds at locations which are otherwise inaccessible to other cultivating equipment.

Another object of the present invention is to provide gardening tools capable of being easily manipulated to remove weeds or other undesirable vegetation including both tall growing grasses within dimensionally restricted areas such as areas adjacent tree trunks, fences, etc.

A further object of the present invention is to provide an earth-working and vegetation-removing gardening tool of wide utility capable of being re-conditioned for use in connection with different requirements including the digging of holes of different sizes, and removal of different types of vegetation including tall grasses and fine grasses.

A still further object of the present invention is to provide a hand manipulated gardening tool effective and easily operated in soils offering different amounts of resistance, said tool featuring facilities for easy removal of earth and vegetation collected therein.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a front elevational view of one form of gardening tool assembly constructed in accordance with the principles of the present invention.

FIGURE 2 is an enlarged partial front view of the gardening tool illustrated in FIGURE 1.

FIGURE 3 is a bottom plan view of the tool illustrated in FIGURE 2.

FIGURE 4 is a transverse sectional view taken substantially through a plane indicated by the section line 4—4 in FIGURE 1.

FIGURE 5 is a partial sectional view taken substantially through a plane indicated by the section line 5—5 in FIGURE 2.

FIGURE 6 is a transverse sectional view taken through a plane indicated by the section line 6—6 in FIGURE 2.

FIGURE 7 is a partial front elevational view of the gardening tool illustrated in FIGURE 1, re-conditioned for use in connection with different requirements.

FIGURE 8 is a perspective view illustrating the use of the gardening tool under certain conditions.

FIGURE 9 is a partial front elevational view of a modified form of gardening tool illustrating a modification thereof at the upper end portion.

FIGURE 10 is a partial elevational view of a modified form of gardening tool at the lower end portion thereof.

FIGURE 11 is a sectional view taken substantially through a plane indicated by the section line 11—11 in FIGURE 10.

FIGURE 12 is a front elevational view of the lower portion of a gardening tool illustrating another modification.

FIGURE 13 is a partial front elevational view of a gardening tool illustrating a still further modification of the lower end portion thereof.

FIGURE 14 is a partial front elevational view of a gardening tool illustrating another modification of the lower portion thereof.

FIGURE 15 is a partial sectional view taken substantially through a plane indicated by the section line 15—15 in FIGURE 12.

FIGURE 16 is a front elevational view of another modified form of tool with expander attachment.

FIGURE 17 is a front elevational of the tool illustrated in FIGURE 16 with the expander attachment repositioned.

FIGURE 18 is a front elevational view of a tool made in accordance with the present invention incorporating a certain removal feature.

FIGURE 19 is a transverse sectional view taken substantially upon a plane indicated by section line 19—19 in FIGURE 18.

FIGURE 20 is a diagrammatic illustration of the tool and the action involved therewith.

FIGURE 21 is a diagrammatic illustration of the action involved with the tool of the present invention.

FIGURE 22 is a diagrammatic illustration of another use of the tool of the present invention.

Referring now to the drawings in detail, it will be observed from FIGURES 1, 2 and 3, that the gardening tool generally referred to by reference numeral 10 includes an elongated shank 12 preferably made of angle iron having perpendicular side portions 14 and 16. The side portions 14 and 16 intersect along a longitudinal, rotational axis 15 about which the shank 12 is adapted to be rotated so as to engage between the side portions, a vertical growth 13 of vegetation within a 90° segment as seen in FIGURE 21 for twisting about the longitudinal axis 15. Connected to the upper end 18 of the shank is a crankshaft 20 having a crank portion 22 rotatably mounting a spinning handle 24, pressure being manually applied along the longitudinal axis of the shank 12 and crankshaft 20 by means of the upper knob 26. Connected to the lower end of the shank 12, is an elongated coring pivot member generally referred to by reference numeral 28, the pivot member being aligned with and extending along the longitudinal axis of the shank so as to fixedly establish the longitudinal axis within the ground so that the shank may be rotated thereabout by means of the crank structure connected to the upper end of the shank. It will be appreciated of course, that other types of cranking structure may be connected to the upper end of the shank for imparting rotation thereto about its longitudinal axis. FIGURE 9 accordingly illustrates another form of crank structure including the crankshaft 30 connected to the upper end of the shank and extending along the longitudinal axis thereof, the crankshaft 30 rotatably mounting a handle member 32 and being connected to a laterally offset portion 34 on which a second handle member 36 is rotatably mounted. The crank structure illustrated in FIGURE 9 will therefore be suitable in connection with rotation of the shank with the longitudinal axis thereof inclined to the vertical because of the need for manually holding the longitudinal axis at the desired inclination to the vertical as illustrated in FIGURE 8.

As more clearly seen in FIGURES 2, 3 and 6, the elongate pivot member 28 is connected to the shank member and extends therefrom adjacent to the longitudinal axis thereof. Accordingly, the pivot member 28 may be cut from the same angle iron member which forms the shank member 12 so that the external side surfaces 38 and 40 as more clearly seen in FIGURE 6, intersect along the longitudinal axis of the shank member. It will also be observed, that the side surfaces 38 and 40 of the pivot member taper downwardly toward an earth-piercing end portion 42 by means of which the tool 10 may be initially sunk into the earth so as to bring the fork assembly 44 into contact with the earth as well as to fixedly establish the longitudinal axis in the earth about which the tool is to be rotated. As shown in FIGURES 2 and 3, the pivot member 28 may be formed from an angle member in one piece with the fork assembly 44 and secured therewith to the lower end of the shank member 12. Alternatively, the pivot member may be separately but rigidly connected to the lower end portion of the shank member such as illustrated in connection with the pivot member 48 in FIGURES 12 and 15 connected to the lower end portion of a shank member 50 by means of the fastener assembly 52. It will also be appreciated, that the fork assembly may be formed integral at the lower end portion of the shank member such as the fork assembly 54 illustrated in FIGURES 12 and 15. It will also be apparent, that both the pivot member and the fork assembly may be separately formed and attached to the shank member at the lower end thereof. Accordingly, FIGURES 10 and 11 illustrate the pivot member 56 and the fork assembly 58 formed integral with the shank member 60 while in FIGURE 13, the pivot member 62 is formed integral with the fork assembly 64 at the lower end portion of the shank member 66. In FIGURE 14, the shank member 68 formed integral with the pivot member 70 and fork assembly 72 also adjustably mounts a second pivot member 74 formed integral with a cutter assembly 76 for purposes to be hereafter explained.

Referring once again to the tool as illustrated in FIGURES 2 and 3, it will be observed that the fork assembly 44 includes a pair of claw blade members 78 which extend longitudinally from the side portions 14 and 16 of the shank member and hence extend radially with respect to the longitudinal axis thereof with approximately 90° therebetween. It will be noted however from FIGURE 3 in particular, that the lower end portions of the claw blade members 78 are slightly curved away from each other out of radial relation to the longitudinal axis and terminate longitudinally spaced above the earth-piercing end 42 of the pivot member 28 so as to form a rotational cutting plane with the terminal edges of the claw blade members engaging the earth at an angle to the vertical so as to facilitate cutting thereof. Accordingly, each of the claw blade members 78 is provided with a beveled edge portion 80 which extends vertically in spaced confronting relation to the pivot member 28, the beveled edge portions 80 on each of the claw blade members facing in opposite directions designed to thereby engage both earth and vegetation in one direction of rotation of the tool about the longitudinal axis of the shank member 12. Also, an outer beveled edge 82 is provided at the lower end portion of each of the claw blade members 78, the beveled edge portions 80 of the claw blade members also having an upper taper portion 46 and a diverging portion on which teeth 84 are formed, said teeth projecting in a downward direction. From the foregoing description of the fork assembly 44, it will be apparent that the claw blade members will be effective to establish a cutting plane anchored in the ground by means of the pivot member 28 with the beveled edge portions 80 thereof operative to bend and twist vegetation about the pivot member. The pivot member being non-circular in cross-section and hence formed with sharp edges, cooperates with the claw blade members in wrapping or winding the vegetation 81 tightly about the pivot member within the space between the pivot member and the confronting beveled edge portions 80 as diagrammatically shown in FIGURE 20. Engagement of the vegetation by the downwardly projecting teeth 84, will prevent unwinding thereof. Also, by virtue of the diverging relationship between the edge portions 80 where the teeth 84 are formed and the downward taper of the pivot member 28, both soil and vegetation may easily be slidably removed therebetween when the tool is fully loaded. It will also be appreciated, that the longitudinal projection of the pivot member 28 beyond the fork assembly 44 is essential to both initiate cutting of the soil by the fork assembly at the desired location and to anchor the longitudinal axis about which the tool is to be rotated by the crank structure. When rotating the tool with the longitudinal axis inclined to the vertical as illustrated in FIGURE 8, cutting of relatively hard soil will be facilitated since the cutting plane established by the fork assembly at the lower terminal end thereof will be inclined with respect to the surface of the earth. For the purpose of cutting a larger hole or working a larger area of earth about the pivot member, various attachments may be mounted on the shank member.

As more clearly seen in FIGURES 1, 2 and 3, expander members 86 and 88 are mounted on the shank member 12. The expander member 86 includes a mounting portion 90 and a blade portion 92 forming a corner which extends longitudinally beyond the mounting portion 90 forming a fork tine 94 which terminates above coring knife portion 93 terminating just below the cutting plane of the fork assembly 44. Similarly, the expander member 88 is provided with a mounting portion 96 and is provided with a blade portion 98 forming a coring knife portion and a tine 100 at one end thereof. The expander blade portions 92 and 98 are respectively disposed in perpendicular relation to the mounting portion 90 and the side portions 14 and 16 of the shank member to which the expander members are connected. One of the expander members 88 is also formed with a second blade member 102 as shown in FIGURE 8 which extends radially with respect to the longitudinal axis of the shank member. The blade members 92, 98 and 102 are therefore effective to enlarge the circular cutting plane of the fork assembly 44 forming therewith an irregular saw cutting edge for facilitating the cutting and working of an enlarged circular area of soil. It will be appreciated, that removal or replacement of expander members from the shank member 12 in accordance with earth-working requirements, may be accomplished. Accordingly, each of the expander members 86 and 88 is provided with a pivotal connection 106 so as to lock the expander member on the shank member in angularly adjusted position. The expander members may also be secured to the shank member but spaced therefrom by spacer elements 108 as more clearly seen in FIGURE 4. Pivotal adjustment of the expander member may therefore be effected about the central wing nut fastener assembly 106 and which is then tightened. Should it be desired to temporarily remove one of the expander members such as the expander member 88 out of operative position, loosening of the pivotal connection 106 may be effected so that the expander member may be swung 180° in order to upwardly project the tine and coring knife as shown in FIGURE 7. It should also be noted, that the projecting portions of the wing nut fastener assemblies 106 are disposed on the inside of the side portions 14 and 16 of the shank member so as to avoid accumulation and catching of tall grasses by the expander members. It will also be appreciated, that the expander members could be longitudinally adjusted if so desired to vary the level of the tines and coring knives, relative to the cutting plane established by the fork assembly 44. It will therefore be observed from FIGURE 14, that associated with the modified form of fork assembly 72 otherwise similar to the fork assembly 44, are a pair of radially outer beveled cutter blades 112 by means of which a hole to be dug by the tool may be progressively enlarged in connection with certain requirements. It will also be observed in connection with FIGURE 14, that adjustable fastener assemblies 114 are mounted on the shank portions 68 and received within vertical slots 115 of the integral assembly of an additional pivot member 74 and cutter assembly 76. Accordingly, by lowering the integral assembly of the pivot member 74 and cutter 76, as illustrated in FIGURE 14, the tool may be utilized in connection with fine grass.

Where short grass is involved, the claw blade members 117 of the fork assembly 58 illustrated in FIGURES 10 and 11, may be curved outwardly to a greater extent so as to reduce the earth-cutting action. Also, the tools may be manipulated in a horizontal position for such purpose as illustrated in FIGURE 22. FIGURES 12 and 15 also illustrate a fork assembly 54 which includes radially outer cutting blade portions 121 having terminal edges terminating just below the cutting plane established by the claw blade members 123 in connection with other earth-working requirements. The claw blade members 123 are similar in construction to the claw blade members 78 described with respect to the fork assembly 44 in FIGURES 2, 3 and 6 but are spaced from the pivot member 48 at the upper ends of the claw blade members by the cutter edge portion 125 in connection with other vegetation cutting requirements. In FIGURE 13, the claw blade members 127 of the fork assembly 64 are spaced from the pivot member 62 and the cutter blade members 128 disposed therebetween in connection with other earth-working requirements. It will therefore be appreciated, that a tool constructed in accordance with the principles of the present invention may be formed integrally with or removably connected to the modified form of fork assemblies 54, 58, 64, 72 and 76 as desired, all of said fork assemblies featuring the claw blade structure as described with respect to the fork assemblies 44 in FIGURES 2, 3 and 6 disposed in spaced relation about the central pivot member in each case.

FIGURES 16 and 17 illustrate one form of tool modified by virtue of the expander attachment associated therewith. The tool therefore also includes angle iron shank member 116, the lower operative end of which terminates in a pivot member 118 similar in construction and function to the pivot member 28 described with respect to the tool 10 in FIGURES 1 through 3. Also similarly associated with the pivot member 118, are a pair of claw members 120 establishing a cutting plane above the lower pivot end of the pivot member 118 to cut, twist and wind vegetation about the pivot member as hereinbefore described. Each of the leg portions of the shank 116 also mounts an expander member 122 and is accordingly provided with an aperture 124 for receiving a pivot fastener assembly 126 whereby the expander member 122 may be angularly displaced by 180 degrees respectively between the position shown on the two leg portions of the shank 116 in FIGURE 16. One end of the expander member 122 is provided with a coring knife portion 128 formed between the right angle leg portions 130 and 132. The leg portion 132 also is provided with a projecting tine 134. With the coring knife member 128 and tine 134 being disposed in operative position so as to present cutting edges in the cutting plane established by the claw members 120, the expander member is locked in position by means of the fastener assembly 136 which extends through a vertically elongated slot 138 in the shank 116 and a notch 140 formed in an upper beveled edge 142 of the leg portion 130. The beveled edge 144 at the end of the leg portion 130 opposite the beveled edge 142, is also provided with a notch 146 whereby the expander member may be locked in a position 180 degrees from the position in which the expander member is mounted for the purpose of enlarging the hole cut by the tool. Accordingly, in this latter position, the leg portion 132 of the expander member is provided with a beveled tapering edge 148 whereby the hole initially dug by the pivot member 118 and claw members 120 may be gradually enlarged by the cutting action of the bevel edge 148.

The leg portion 130 of the expander member is also provided with an inclined notch 150 formed between the outer edge 152 of the leg portion 130 and an inclined edge 152 extending upwardly toward the end beveled edge 142. Accordingly, when the expander member is angularly displaced about the pivot bolt 126, to the position illustrated in FIGURE 17, it may be locked in this position by means of the fastener assembly 136 extending through the vertically elongated slot 138 and the inclined notch 150. In this position, a beveled edge portion 156 at one end of the side edge 152 of the leg portion 130 will be aligned with the longitudinal axis of the shank 116 while the longitudinal axis of the expander member 122 itself will terminate at the end of the coring knife member 128 at the longitudinal axis of the shank 116. Thus, the expander member 122 in the position illustrated in FIGURE 17, will be operative to facilitate the cutting of a smaller hole than the enlarged hole that would otherwise be cut when the expander member is disposed parallel to the shank.

Any one of the tools hereinbefore described may be provided with facilities for removing accumulated earth or soil from the blades, knife members, claws, etc. Referring therefore to FIGURES 18 and 19, it will be observed that the shank portion 158 is provided intermediate the upper and lower ends thereof, with a tubular guide member 160 secured between the leg portions of the shank in any suitable manner as by welding for example. Slidably and rotatably mounted through the tubular guide member 160, is the rod member 162, the lower end of which is connected to a cleaning portion 164. The upper end of the rod 162 above the tubular guide member 160, is provided with a manually operable hook portion 166 whereby the rod may be slidably and angularly displaced for the purpose of dislodging dirt along the cutting edges and recesses at the operative end of the tool. When not in use, the cleaning implement described with respect to FIGURES 18 and 19, may be held in an inoperative position spaced above the lower operating end of the shank by means of a retaining notch 168 formed at the upper end of the shank 158 within which the hook 166 is adapted to be received, as shown by dotted line in FIGURE 18.

From the foregoing description, the construction and utility of the gardening tool of the present invention and the various modifications thereof, will be apparent. It will therefore be appreciated, that the apparatus is adapted to wind and hold vegetation between the fork assembly and the pivot member which is sharp edged so that the vegetation may be wrapped tightly thereabout upon rotation of the tool about the rotational axis established by the pivot member. The claw blade members although operative to work the soil, will be effective to twist the grasses without cutting so that it may be wrapped about the pivot member for removal of vegetation, such as onion grasses, roots and all, that become trapped in the acute angle of the shank as shown in FIGURE 21. This is a distinct attribute of the present tool in that it will not push the vegetation to the outer surface of the hole being formed by the claw blade members, the downturned teeth of which prevent unwinding of the vegetation. When the tool has become fully loaded and withdrawn from the ground, easy removal of the vegetation and earth is effected because of the diverging relationship between the confronting beveled edge portions of the claw blade members and the taper of the pivot member. Also, the spacing between the confronting edges of the claw blade members and the pivot member will guide and confine the grasses wrapped about the pivot member for facilitating the cutting of the earth. The tool will therefore be useful in connection with the formation of irrigation holes of various sizes dependent upon the expander attachments and form of fork assemblies utilized as well as to selectively remove undesired vegetation or weeds.

The foregoing is considered as illustrative only of the principles of the invention. Further, since numerous modifications and changes will readily occur to those skilled in the art, it is not desired to limit the invention to

What is claimed as new is as follows:

1. A soil working and vegetation removing tool comprising, elongated shank means having a cross-sectional configuration adapted to enclose a vertical growth of vegetation in offset relation to a longitudinal axis between upper and lower ends of the shank means, fork means connected to said lower end of said shank means terminating in a circular cutting plane for twisting said growth of vegetation in response to rotation of the shank means about said longitudinal axis, coring pivot means connected to said lower end of the shank means and projecting below the circular cutting plane for penetration of the earth, crank means connected to said upper end of the shank means for imparting rotation thereto about the longitudinal axis fixedly established in the earth by said coring pivot means, expander blade means connected to said lower end of the shank means and extending laterally therefrom at an angle to the fork means to form a saw cutting edge therewith in said circular cutting plane, and means for mounting the expander blade means on the shank means for selective positioning thereof in longitudinally spaced relation to the circular cutting plane and adjustably spaced relation to the fork means within the circular cutting plane, said pivot means comprising an elongated member which is substantially triangular in cross section to form longitudinal folding edges for tightly wrapping the vegetation thereabout, said elongated member tapering toward an earth piercing end away from the shank means for slidable removal of vegetation and earth between the pivot means and the fork means, said fork means including, a pair of claw blades radially extending from said longitudinal axis in spaced relation to said pivot means, each of said claw blades having oppositely facing beveled edge portions extending vertically in confronting spaced relation to the pivot means for cutting earth and wrapping said vegetation about the pivot means in response to rotation of the shank means in one direction, and downwardly extending teeth formed on said beveled edge portions for engaging said vegetation to prevent unwinding thereof.

2. The tool of claim 1, wherein said claw blades are curved away from radial relation to said longitudinal axis for engaging the earth at an angle to the vertical.

3. The tool of claim 2, wherein said beveled edge portions of the claw blades diverge away from the pivot means in a downward direction from the shank means.

4. A soil working and vegetation removing tool comprising, elongated shank means adapted to encircle a vertical growth of vegetation in response to rotation about a longitudinal axis extending therethrough, fork means connected to a lower end of said shank means terminating in a circular cutting plane for twisting said growth of vegetation about said longitudinal axis, coring pivot means connected to said lower end of the shank means and projecting therefrom beyond the circular cutting plane along said longitudinal axis, said pivot means comprising an elongated member which is substantially triangular in cross section to form longitudinal folding edges for tightly wrapping the vegetation thereabout, said elongated member tapering toward an earth piercing end remote from the shank means for slidable removal of vegetation and earth between the pivot means and the fork means, said fork means including a pair of claw blades radially extending from said longitudinal axis in spaced relation to said elongated member, each of said claw blades having oppositely facing beveled edge portions extending vertically in confronting spaced relation to the elongated member for cutting earth and wrapping said vegetation about the folding edges of the elongated member in response to rotation of the shank means in one direction, and downwardly extending teeth formed on said beveled edge portions for engaging said vegetation to prevent unwinding thereof, said claw blades being curved away from radial relation to said longitudinal axis for engaging the earth at an angle to the vertical and diverging away from the elongated member in a downward direction from the shank means, crank means connected to an upper end of the shank means for imparting rotation thereto about the longitudinal axis fixedly established in the earth by said earth piercing end of the elongated member, expander blade means connected to said lower end of the shank means and extending laterally therefrom at an angle to the fork means to form a saw cutting edge with the claw blades in said circular cutting plane, and means for mounting the expander blade means on the shank means for selective positioning thereof in longitudinally spaced relation to the circular cutting plane and adjustably spaced relation to the fork means within the circular cutting plane, said beveled edge portions of the claw blades being connected to the pivot means at the lower end of the shank means by a cutting edge portion.

5. The tool of claim 4, wherein said fork means includes beveled cutting blades connected to the shank means in radially spaced relation to the claw blades.

6. The tool of claim 5, wherein said beveled cutting blades terminate in longitudinal spaced relation above the circular cutting plane.

7. A soil working and vegetation removing tool comprising, elongated shank means having a cross-sectional configuration adapted to enclose a vertical growth of vegetation in offset relation to a longitudinal axis between upper and lower ends of the shank means, fork means connected to said lower end of said shank means terminating in a circular cutting plane for twisting said growth of vegetation in response to rotation of the shank means about said longitudinal axis, coring pivot means connected to said lower end of the shank means and projecting below the circular cutting plane for penetration of the earth, and crank means connected to said upper end of the shank means for imparting rotation thereto about the longitudinal axis fixedly established in the earth by said coring pivot means, said pivot means comprising an elongated member which is substantially triangular in cross section to form longitudinal folding edges for tightly wrapping the vegetation thereabout, said elongated member tapering toward an earth piercing end remote from the shank means for slidable removal of vegetation and earth between the pivot means and the fork means, said fork means includes, a pair of claw blades radially extending from said longitudinal axis in spaced relation to said pivot means, each of said claw blades having oppositely facing beveled edge portions extending vertically in confronting spaced relation to the pivot means for cutting earth and wrapping said vegetation about the pivot means in response to rotation of the shank means in one direction, and downwardly extending teeth formed on said beveled edge portions for engaging said vegetation to prevent unwinding thereof.

8. A soil working and vegetation removing tool comprising, shank means adapted to twist a vertical growth of vegetation in response to rotation about a longitudinal axis extending therethrough, fork means connected to the lower end of said shank means terminating in a circular cutting plane for twisting said growth or vegetation about said longitudinal axis, elongated pivot means connected to said lower end of the shank means and projecting therefrom beyond the cutting plane along said longitudinal axis, means connected to an upper end of said shank means for imparting rotation thereto along the longitudinal axis fixedly established in the earth by said pivot means, said shank means including side portions intersecting along said longitudinal axis to which the fork means is connected in radially spaced relation to the pivot means at said lower end, expander blade means mounted on the shank means for enlarging the cutting area of the fork means comprising, an elongated member having bevel edges at opposite ends thereof, one of said ends terminating in a coring knife portion and a tine portion operatively positioned to enlarge the circular cutting area of the fork means, the other end of the elongated member forming a tapering cutting edge for operative positioning in spaced relation to the fork means to gradually enlarge a hole cut thereby, and mounting means for releasably locking said elongated member to the shank means for selectively positioning the elongated member in parallel operative relation to the shank means.

9. The combination of claim 8, wherein said elongated member includes notch means cooperating with said mounting means for locking the elongated member in angular relation to the shank means to operatively present the coring portion and tine portion in intersecting relation to the pivot means to facilitate cutting by the fork means.

10. A soil working and vegetation removing tool comprising, shank means adapted to twist a vertical growth of vegetation in response to rotation about a longitudinal axis extending therethrough, fork means connected to the lower end of said shank means terminating in a circular cutting plane for twisting said growth or vegetation about said longitudinal axis, elongated pivot means connected to said lower end of the shank means and projecting therefrom beyond the cutting plane along said longitudinal axis, means connected to an upper end of said shank means for imparting rotation thereto along the longitudinal axis fixedly established in the earth by said pivot means, said shank means including side portions intersecting along said longitudinal axis to which the fork means is connected in radially spaced relation to the pivot means at said lower end, a blade cleaning element, means slidably and rotatably mounting said element on the shank means, hook means connected to the element for manipulation thereof and retaining means mounted on the shank means for receiving said hook means to hold the element withdrawn in an inoperative position on the shank means.

References Cited by the Examiner

UNITED STATES PATENTS

| | | | |
|---|---|---|---|
| 79,181 | 6/68 | Andrews | 30—310 |
| 473,316 | 4/92 | Hunter | 294—50.7 |
| 1,553,719 | 9/25 | Rhoads | 294—50.9 |
| 2,615,246 | 10/52 | Littig | 30—300 |

FOREIGN PATENTS 862,793   3/61   Great Britain.

ROBERT B. REEVES, *Acting Primary Examiner.*

RAPHAEL M. LUPO, SAMUEL F. COLEMAN,
*Examiners.*